March 17, 1931. G. GORTON 1,797,139
ENGRAVING MACHINE AND THE LIKE
Filed Sept. 14, 1926 10 Sheets-Sheet 1
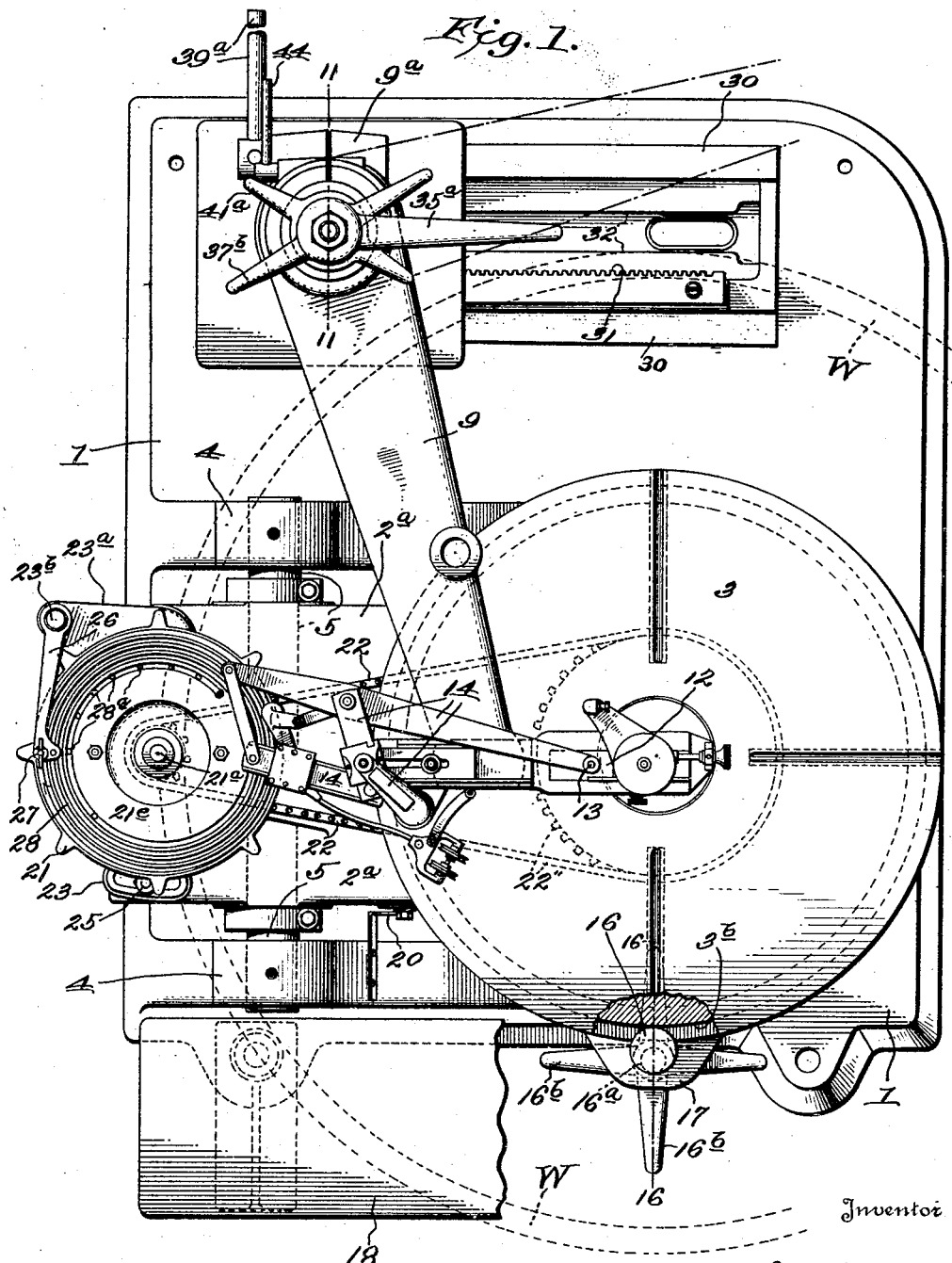

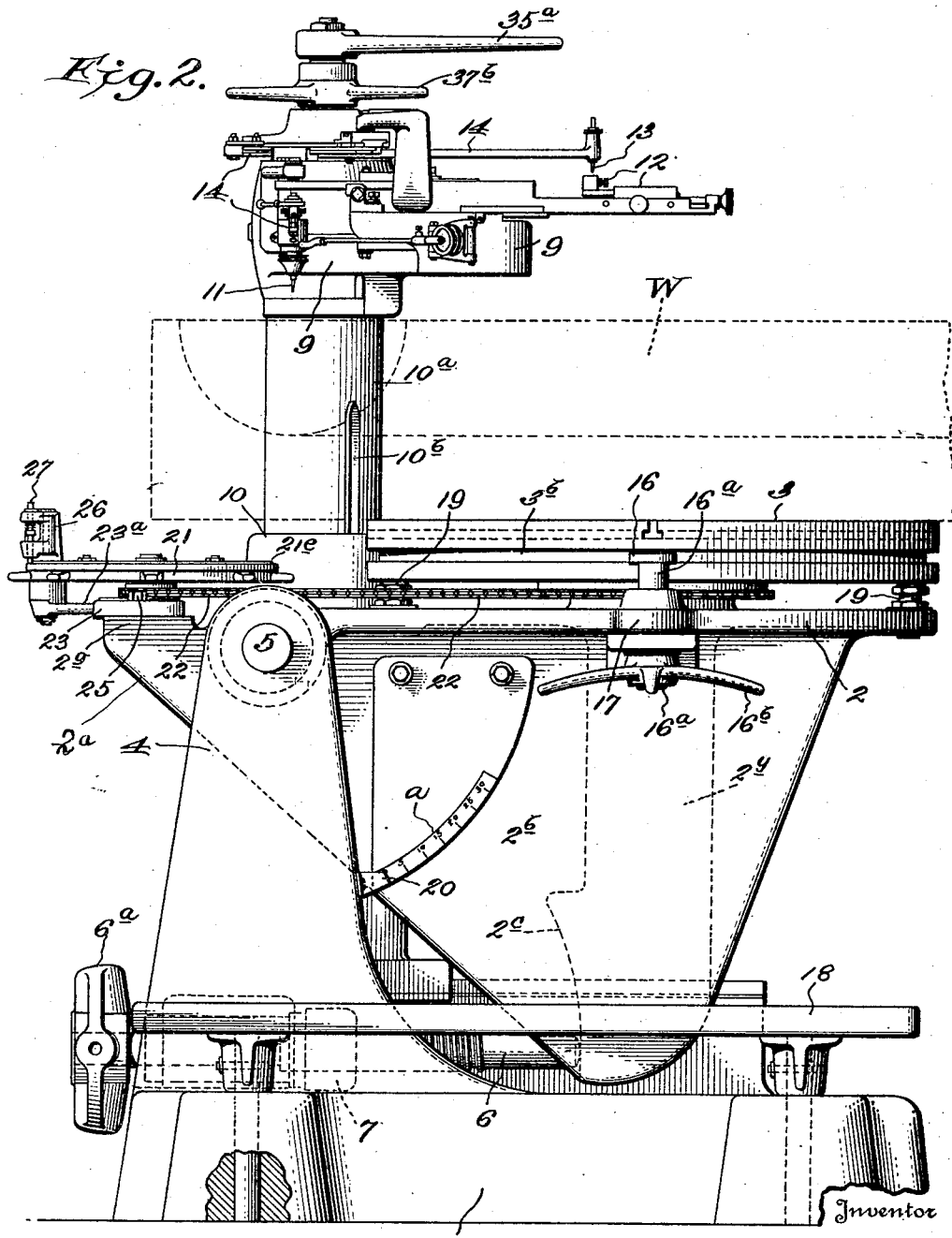

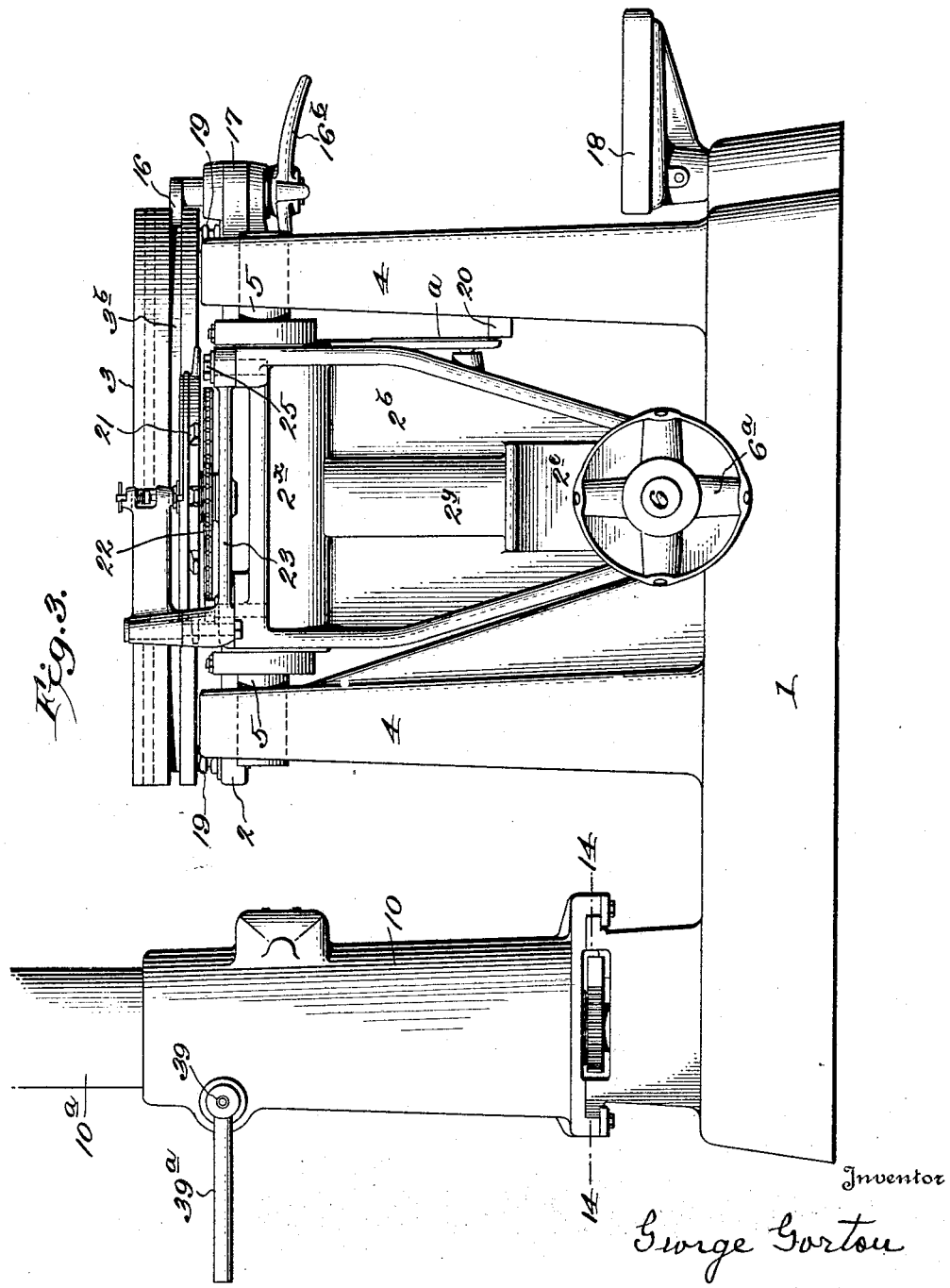

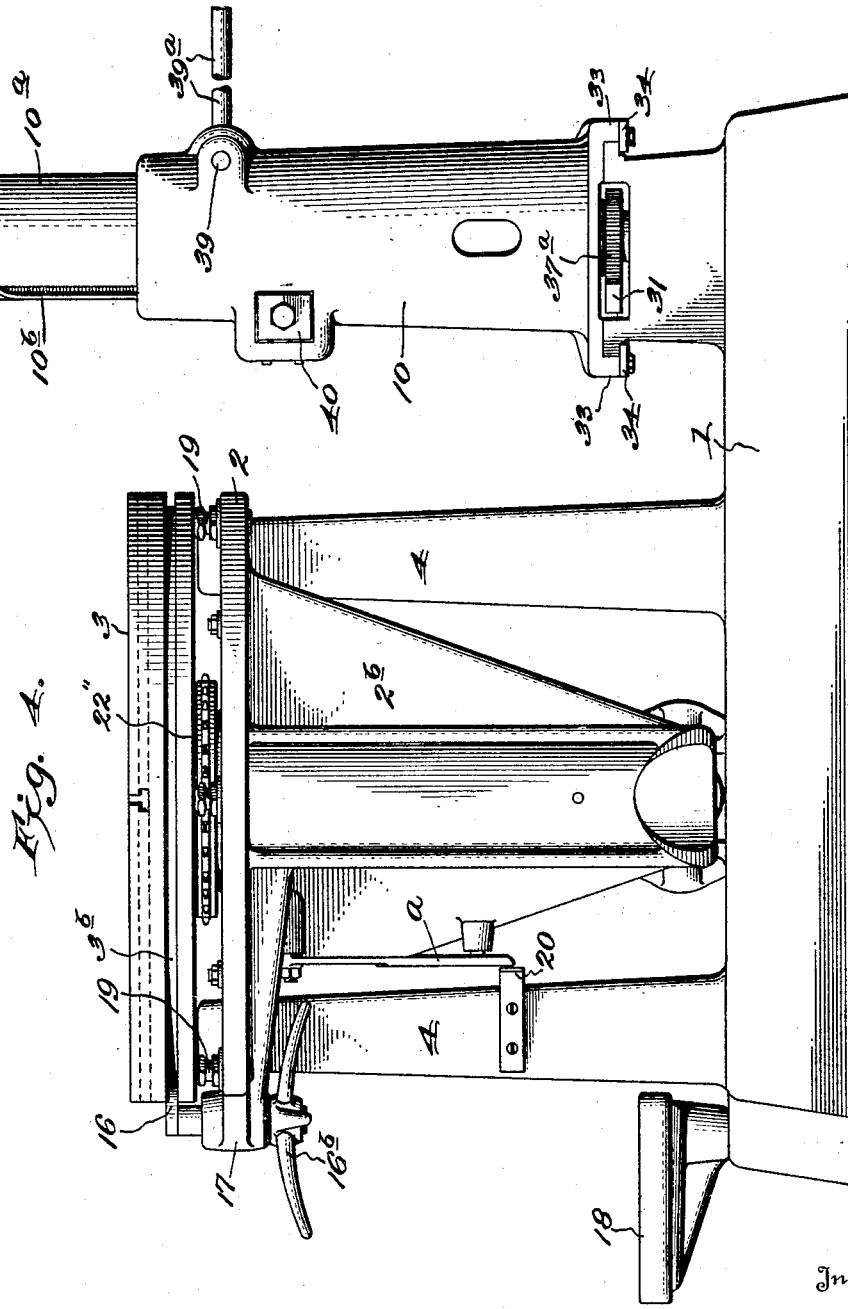

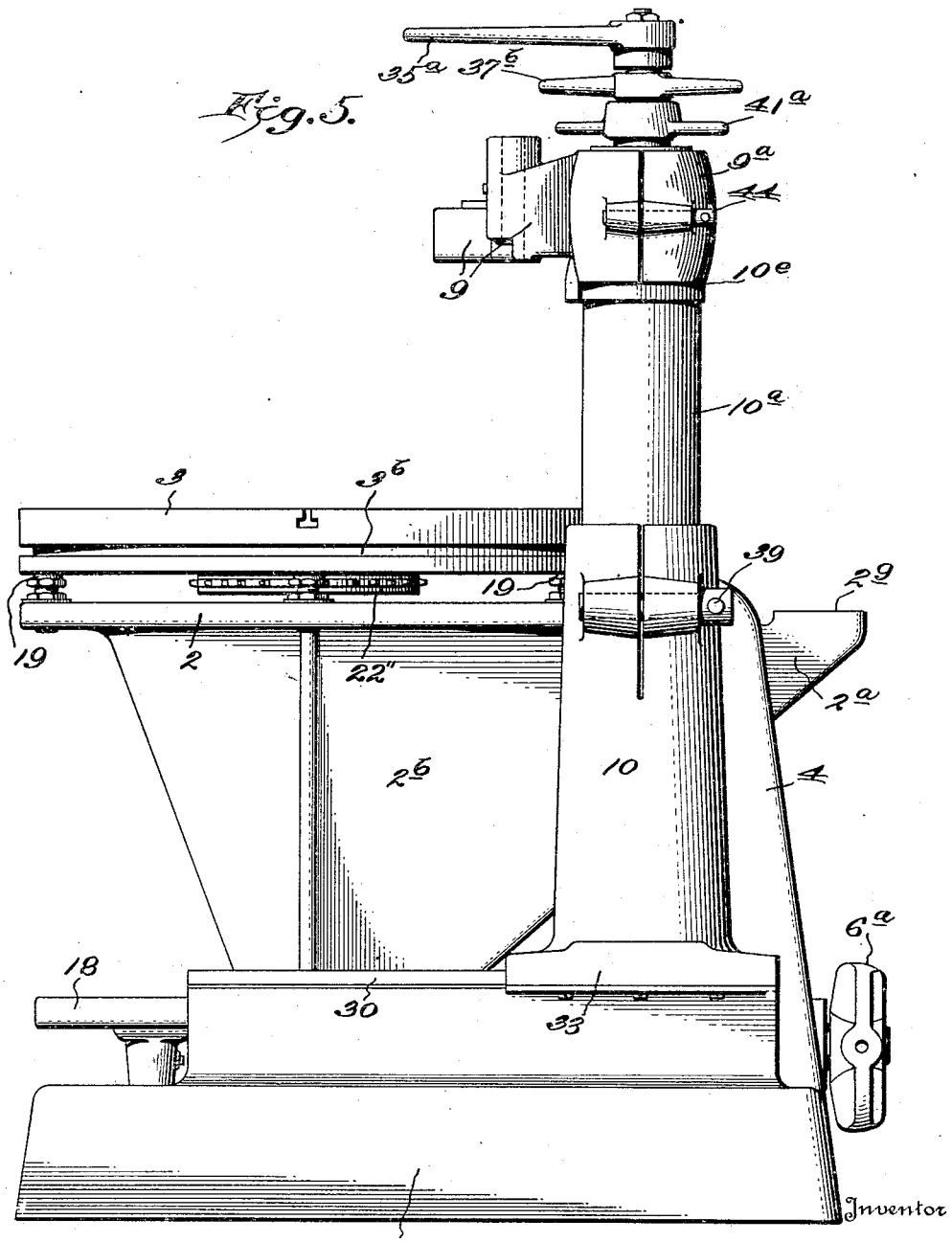

March 17, 1931.  G. GORTON  1,797,139
ENGRAVING MACHINE AND THE LIKE
Filed Sept. 14, 1926   10 Sheets-Sheet 6
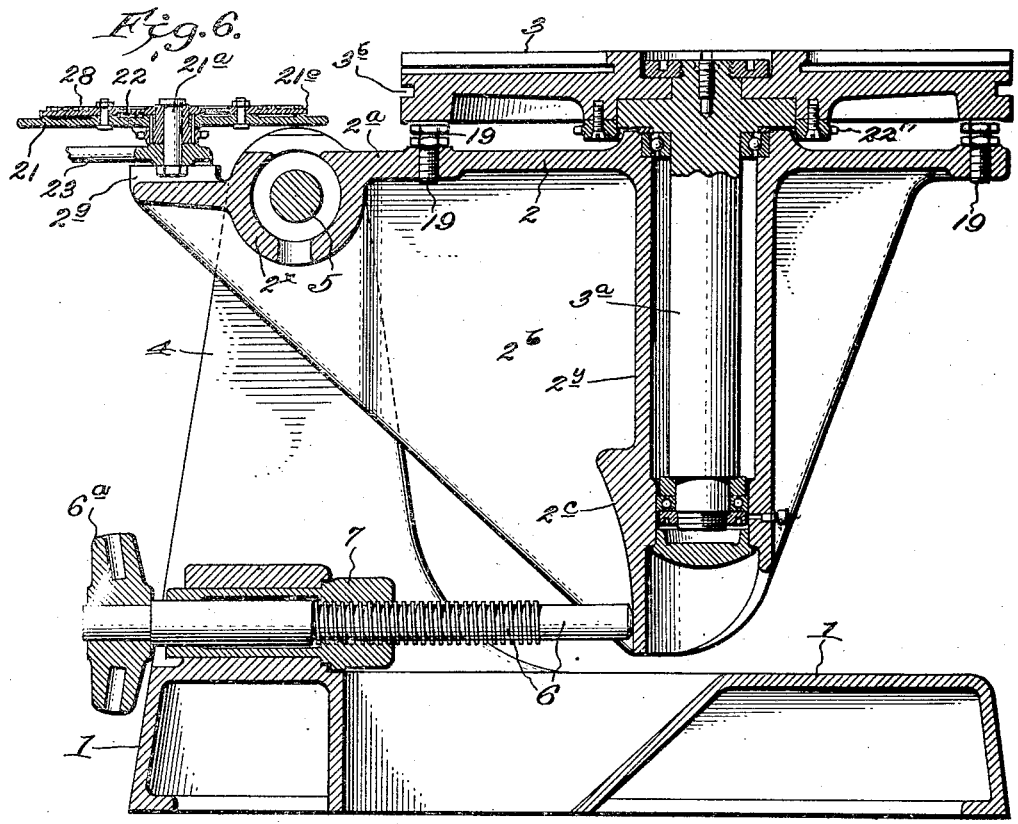
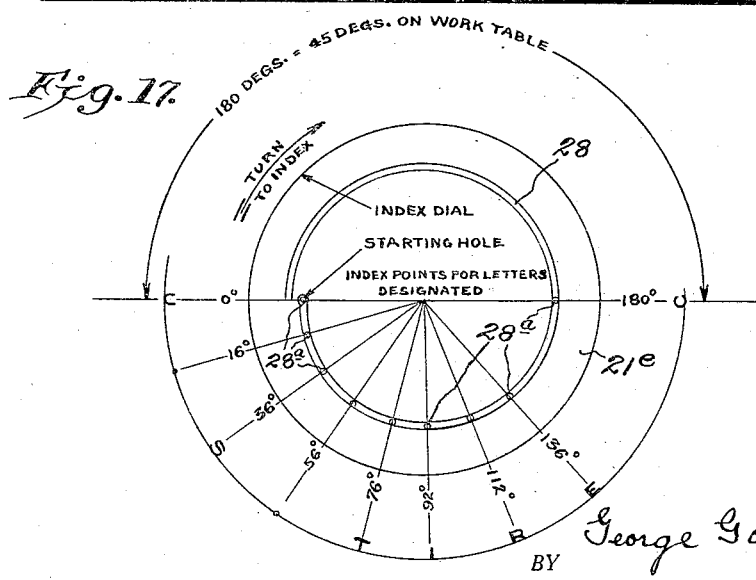
INVENTOR.
George Gorton
BY
Hubert E. Peck ATTORNEY.

March 17, 1931. G. GORTON 1,797,139
ENGRAVING MACHINE AND THE LIKE
Filed Sept. 14, 1926 10 Sheets-Sheet 7

INVENTOR.
George Gorton
by Hubert E. Dick
ATTORNEY.

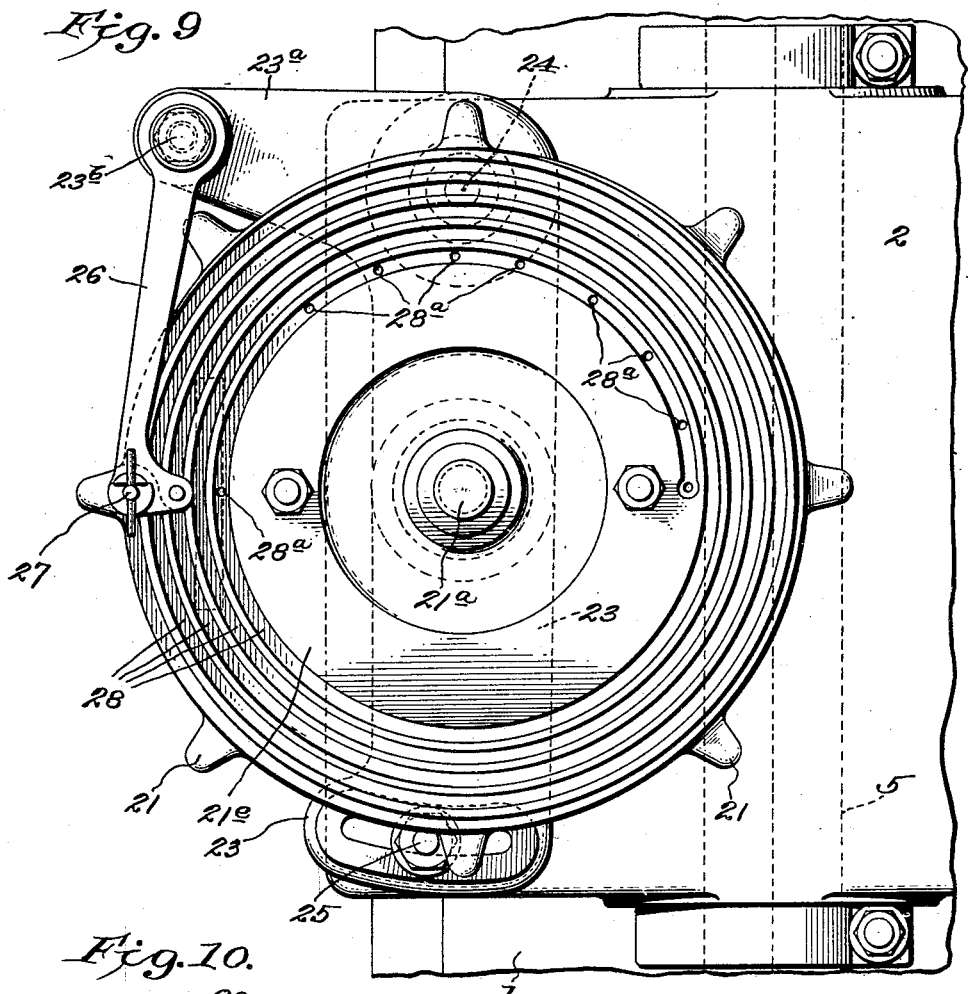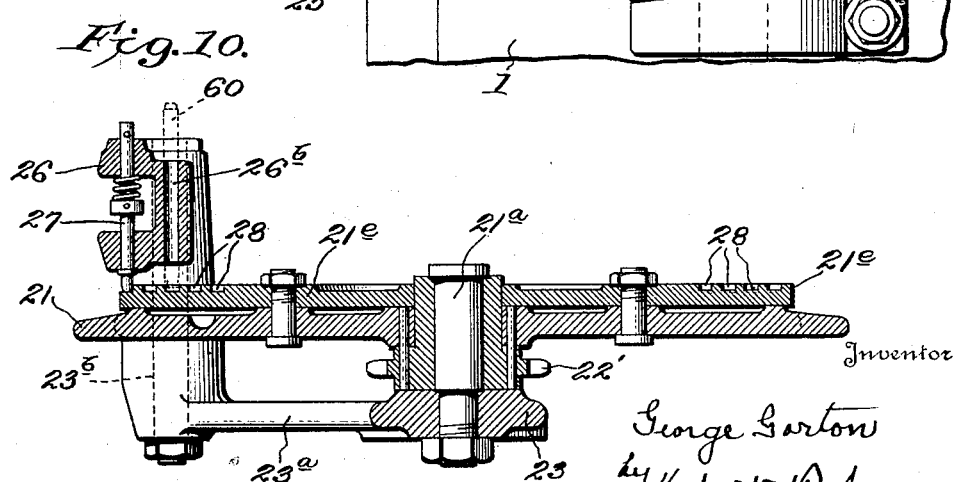

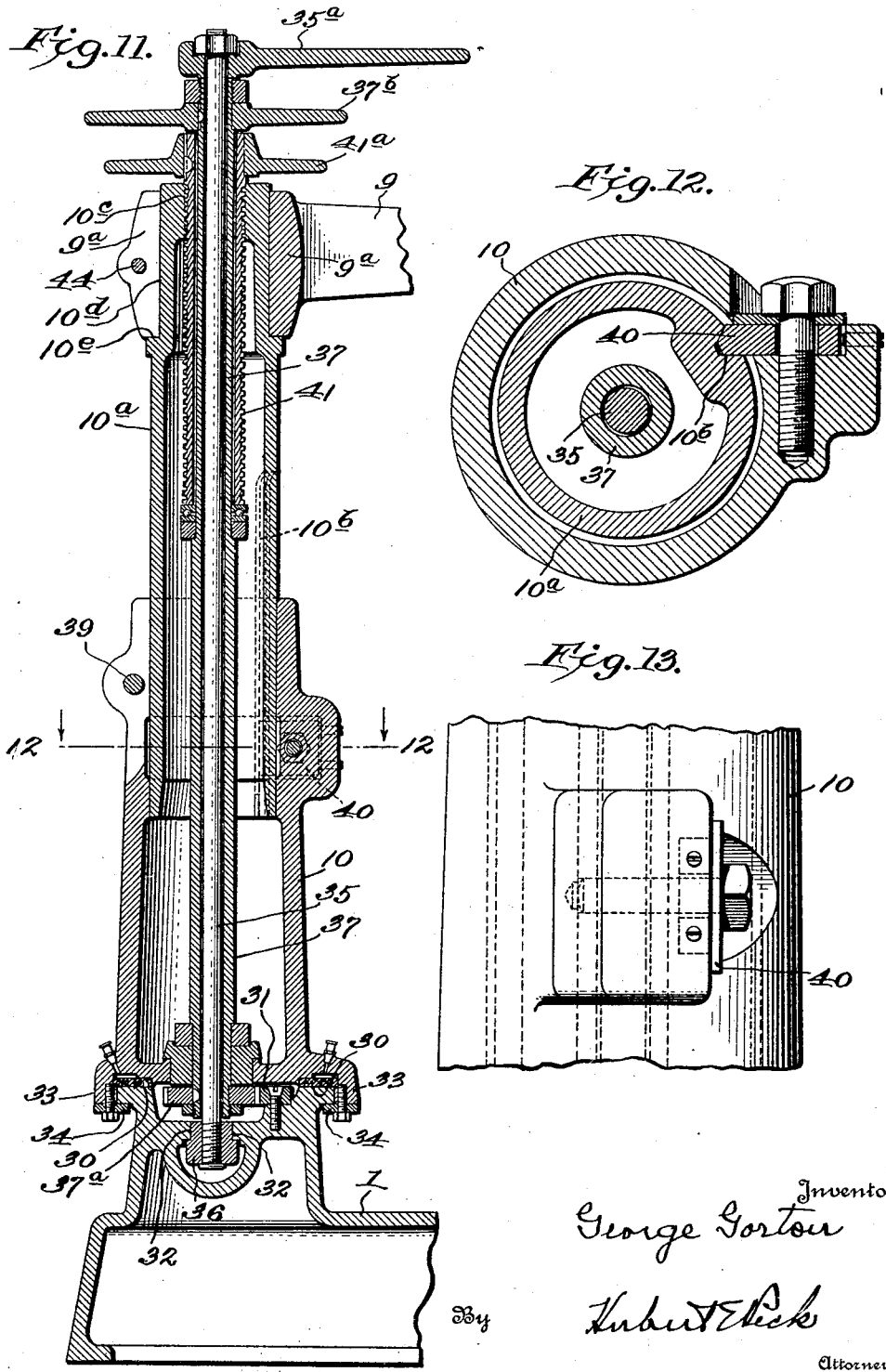

March 17, 1931.  G. GORTON  1,797,139
ENGRAVING MACHINE AND THE LIKE
Filed Sept. 14, 1926    10 Sheets-Sheet 10

George Gorton Inventor
By Hubert E. Peck
Attorney

Patented Mar. 17, 1931

1,797,139

UNITED STATES PATENT OFFICE

GEORGE GORTON, OF RACINE, WISCONSIN

ENGRAVING MACHINE AND THE LIKE

Application filed September 14, 1926. Serial No. 135,431.

This invention relates to engraving machines and the like; and the objects and nature of the invention will be readily understood by those skilled in the art in the light of the following explanations of the accompanying drawings that illustrate what I now believe to be the preferred mechanical expressions or embodiments of my invention from among other combinations, arrangements and constructions within the spirit and scope thereof.

An object of the invention is to provide certain improvements in so-called engraving or milling machines, and the like, whereby such machines are rendered peculiarly advantageous for operating on comparatively large and heavy work, such as tire molds and other forms.

With this and other objects in view, my invention consists in certain novel features in construction, combinations, or arrangements, as more fully described and specified hereinafter.

Referring to the accompanying drawings, forming a part hereof:

Fig. 1 is a top plan, the work on the work table being indicated by dotted lines, certain parts being broken away, and certain hidden parts being indicated by dotted lines, dot and dash lines indicating the rearward inoperative position to which the boom or arm carrying the engraving mechanism can be swung.

Fig. 2 is a front elevation partially broken away, dotted lines indicating the work on the work table before that table is dropped to bring the work up to operative position with respect to the rotary cutter of the engraving mechanism, the endless belt drive for the rotary cutter and the actuating motor therefor not being shown.

Fig. 3 is a side elevation partially broken away.

Fig. 4 is an elevation partially broken away of the opposite side of the machine.

Fig. 5 is a rear elevation, cutting and the indexing mechanisms not being shown.

Fig. 6 is a detail central vertical section.

Fig. 9 is a detail plan of portions of the indexing mechanism and certain adjacent parts, some of the index points being shown.

Fig. 10 is a detail vertical section of a portion of the indexing mechanism.

Fig. 11 is a detail central vertical section on the line 11—11, Fig. 1.

Fig. 12 is a cross section on the line 12—12, Fig. 11.

Fig. 13 is a detail elevation of a portion of the column or post of Fig. 11.

Fig. 17 is a diagram, partially illustrating a method that can be followed in marking the index points on an index dial or plate.

Figure 7:
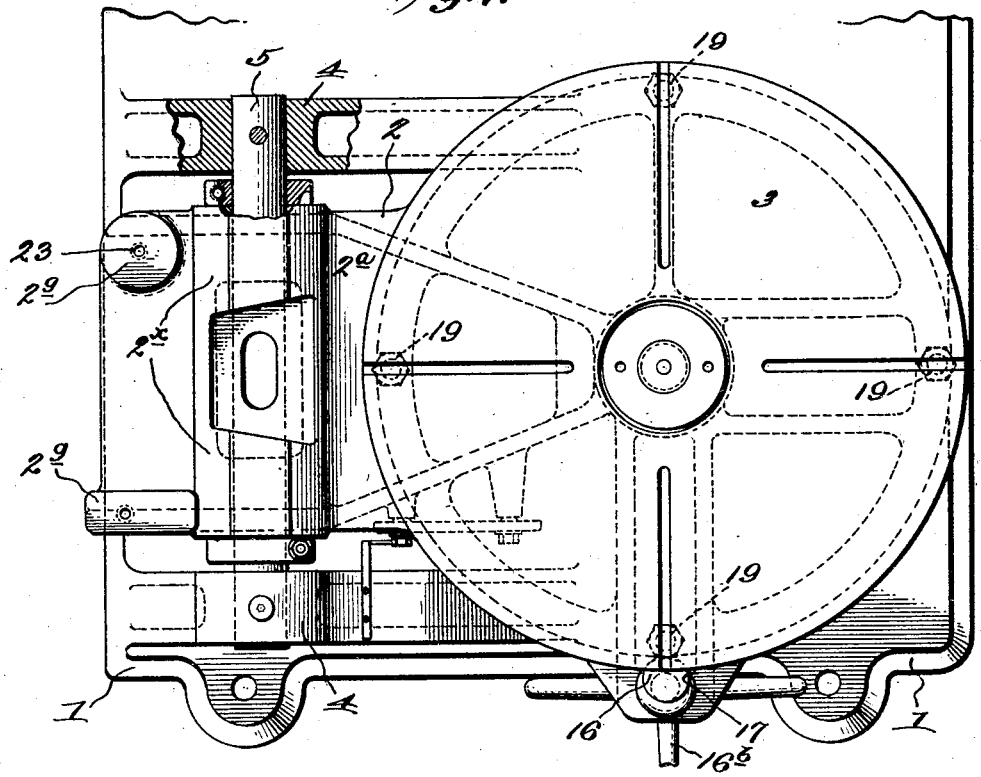
Fig. 7 is a detail sectional plan of the work table with the indexing mechanism removed, the tilting work table carrier, and portions of the base.
Figure 8:
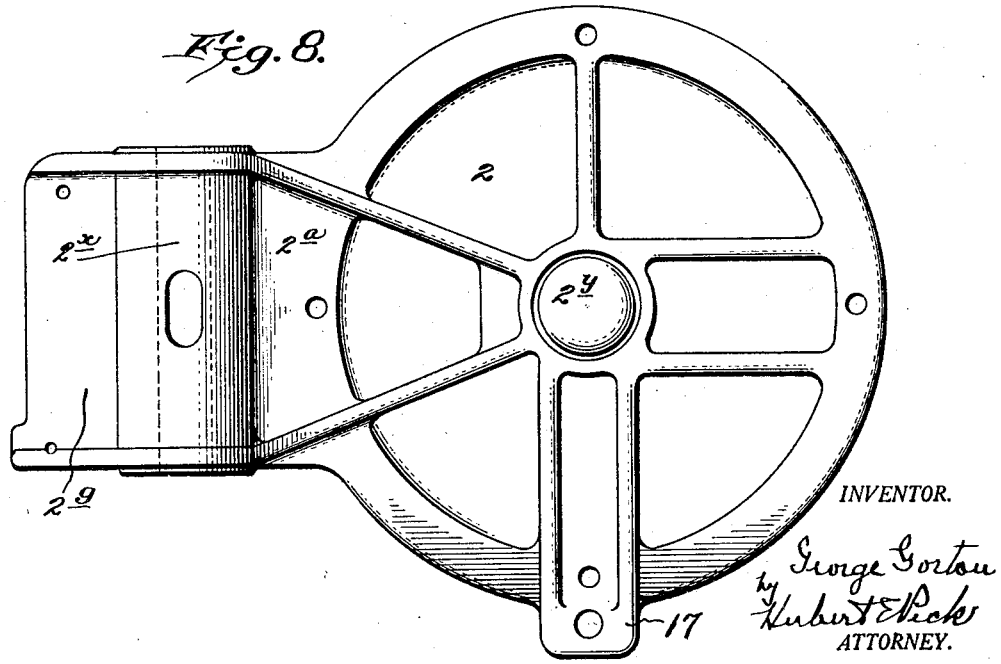
Fig. 8 is a detail bottom plan of the tilting work table carrier.

The machine comprises a strong horizontally disposed base 1, that supports a vertically tiltable or swingable support or carrier 2, for a rotary work table 3, and indexing mechanism for said table. The base carries said support 2, through the medium of a pair of rigid strong spaced upstanding pedestals 4, rigid with the base, a horizontal cross axis or shaft 5, extending through or normally fixed to said support, and extending between the upper end portions of said pedestals and at its ends preferably journaled in said pedestals to rotate or oscillate therein, and a horizontally disposed screw shaft 6, abutting the support to determine the angular position thereof, and longitudinally adjustable through a nut 7, fixed to the base.

The rotary cutter 11, that operates on the work clamped on the work table, the pattern or copy that is clamped in the pattern or copy holder 12, the stylus or tracer 13, that follows the pattern, and the pantograph 14, actuated by the movements of the tracer and controlling the movements of the cutter to reproduce in the work in scaled relation the design or letters of the pattern, are of any approved or suitable constructions and arrangements, and are all carried by a horizontally disposed elevated forwardly extending supporting boom or arm 9, the free end portion of which is formed to receive and carry the pantograph and allied mechanisms in normal operative positions above the work table and the work clamped thereon, also the driving motor (not shown) that preferably drives the rotary cutter 11, through the medium of an endless belt drive (not shown). This boom-like arm 9, while normally fixed with respect to the work table, is adjustable vertically, and bodily movable laterally or horizontally, and is also swingable horizontally on a vertical axis remote from the work table to bring the cutter to the portion of the work desired and to remove the arm and mechanisms carried thereby out of the way when the work is being applied to and removed from the table. The arm 9, is supported by and projects radially from a normally-fixed rigid vertical supporting column 10, that is located a distance laterally beyond and spaced from the work-table and its carrier, preferably at the rear end portion of the base. The column 10, rises from the base to which it is normally rigidly fixed or clamped but on which it is bodily adjustable along a limited horizontal usually straight line path. The column is longitudinally or vertically adjustable in length to enable the operator to set the arm 9 at the elevation desired with respect to the work on the work table. The arm 9, while normally fixed to and rigid with the column 10, is swingable thereon as a center to bring the cutter at the desired point for operation on the portion of the work desired.

In the particular example shown, the work table 3, is circular with a flat top on which the work indicated by dotted lines W, rests and to which the work is clamped by suitable means (not shown) such as are commonly employed in the art for securing work to work tables, the work table top being preferably formed with a center top socket and radial sockets or T-grooves for the reception of work clamps or the like.

This work table is primarily carried by a depending center spindle 3a, perpendicular to the plane of the table, and relatively supported and mounted in the carrier 2. This spindle constitutes the axis of the table, rendering the table rotatable, when unlocked or released, with respect to carrier 2. The spindle 3a, is rigid with the table, in the particular example shown, and depends from the center of the under side of the table, down into the carrier 2, wherein suitable supporting and thrust sustaining bearings are provided for said spindle.

Suitable means are provided for normally locking the table to the carrier against independent movement and rotation, and whereby the table can be released for adjustment or for indexing. For instance, I show the peripheral edge of the table, between the top and bottom faces of the table, formed with an annular groove 3b, to receive the radially projecting lateral clamping head or arm 16, of a vertically movable member, such as vertically slidable clamping bolt 16a, carried by a front rigid forward projection 17, of the carrier 2, and having a vertical hub through which the bolt 16a, is vertically movable. The threaded lower end of this bolt carries a handle nut 16b, by the rotation of which the bolt can be drawn down to tighten the downward grip of the arm 16 against the annular ledge formed by the bottom side wall of groove 3b, to clamp the work table against relative movement. Loosening rotation of the handle nut 16b, loosens the bolt to permit relative rotation of the work table with the clamping arm resting loosely in groove 3b. After the table has been indexed or rotated to the point desired, the nut 16b, is thereupon tightened to clamp the table. This table clamping and releasing mechanism is arranged and conveniently accessible from the front of the machine, particularly to an operator standing on the elevated platform 18 supported above the front end of the base 1.

The vertically tiltable carrier for the work table embodies a top platform or frame 2, parallel with and spaced down from the work table 3, and through which the work table spindle centrally descends.

This platform carries a circular series of spaced vertical stop or abutment screws 19, arranged under the peripheral portion of the bottom face of the work table 3, and adjusted to just clear the bottom face of said table so as not to interfere with the rotary indexing or adjustment of the table, yet so as to engage and uphold the edge portion of the table and relieve the table of excessive bending strain when subjected to a heavy downward blow or load such as imposed by a heavy weight, a heavy mould for instance, accidentally dropped on the outer portion of the table. The free upper ends of the screws are located just under the bottom face of the table and the screws are vertically adjustable in and supported by the platform 2.

The platform 2, is elevated above the base 1, and located to one side of the pedestals 4, and is formed with a neck or portion 2a, of reduced width, projecting radially therefrom through the space between the pedestals 4, above the shaft 5, and projecting outwardly beyond the same. This lateral neck 2a, is secured to elevated shaft 5, the shaft ends being mounted to rotate in the upper ends of the pedestal, or the shaft ends can be secured to the pedestals 4, and the work table carrier can oscillate vertically on the shaft 5, the neck being formed with a transverse hub or tubular housing 2x, receiving and supporting the tilting carrier from the shaft 5.

A strong frame or housing 2b, is provided rigid with and depending from the platform 2, and this housing provides a tight lubricant case or well 2y, and the necessary supports for bearings for the work table spindle 3a, as well as curved vertical bearing and stop wall or surface 2c, to abut the inner end of the horizontal stop screw 6, that determines the angular position of the carrier and work table.

The center of gravity of the carrier with its load, is located to one side of the horizontal axis 5, on which the carrier is vertically swingable and the constant tendency of the carrier is to drop and lower the work table to a downwardly and outwardly inclined position and hence to swing the depending frame 2b, downwardly and laterally between the pedestals and under the axis 5. This downward swing of the carrier under its load, is controlled and resisted by the interposition of the shaft or screw 6, abutting curved wall 2c, so that the angular position of the carrier can be controlled to set the work table and the work thereon at the elevation and angular position desired.

For instance, in Fig. 2, the work table is in the horizontal position, i. e. set at an angle of 90° to the vertical axis of the engraving cutter, and the carrier is held in this position by the weight thereof with its load (the work table and the work) holding the curved abutment wall 2c, against the end of stop shaft 6. By adjusting this shaft 6, by its operating wheel 6a, to move the same toward the left (Fig. 2) the carrier under its load will drop or swing down on axis 5, holding the wall 2c, against the shaft end to elevate the left portion of the work, Fig. 2, to operative position with respect to cutter 11. In the particular example illustrated, the work table is in this way vertically adjustable angularly through about thirty degrees, as indicated by the scale a, and the pointer or index 20, one mounted on the carrier and the other on the adjacent pedestal 4.

The carrier and its load can be swung upwardly to restore the table and work to the horizontal position for application or removal of the work, by the cam action of the end of the shaft 6 on the curved wall 2c, by rotating said shaft to feed the same toward the right (Fig. 2), both the screw shaft and wall 2c being depressed with respect to the elevated axis 5 and the weight or load of the work table carrier.

The outer end of the elevated neck 2a, of the work table carrier, projects to the left (Fig. 2) of the shaft 5 and beyond the pedestals 4 while the platform 2, of the carrier and the work table are located beyond the opposite side of the shaft 5 and the pedestals 4, or to the right thereof (Fig. 2).

This outer end of the neck 2a, of the work table carrier, provides an elevated support 2g for the actuating and controlling members of the work table indexing means. For instance, I show a flat hand-operated or handled rotary index wheel, plate or disk 21, supported in an accessible elevated position on and above said outer end of neck 2a, and rotatable on an axis that is always parallel with the axis on which the work table rotates. The work table and said index disk 21, are operatively connected so that the work table (when unlocked) can be rotated or indexed forward by rotation of the hand-rotated index disk. For instance, I show the work table connected to the index disk by means of sprockets and sprocket chain driving or rotating gearing or connection, comprising sprocket wheels 22', 22'' concentric and rigid with and beneath the disk and table, respectively, and a connecting endless sprocket chain 22, operatively connecting said wheels.

In the particular example illustrated, the horizontally disposed index plate or disk is spaced radially a distance from the horizontally disposed work table, and the upright shaft or spindle 21a, that forms the axis of rotation of the index plate, is carried by a laterally swingable bracket or arm 23, fulcrumed at 24, to the neck end of the work table carrier, so that the slack in the sprocket chain 22, can be taken up by swinging the bracket 23, in the appropriate direction. This bracket is normally held in fixed position by clamping screw or bolt 25, adjustable in the adjacent portion of the carrier neck.

The sprocket chain tightening bracket 23, that carries the indexing wheel 21, is formed at its rear or fulcrumed end with a laterally or radially projecting arm 23a, the free end of which carries an upstanding pivot pin or axis 23b, beyond the periphery of the wheel 21. The rear end of the forwardly projecting indexing or stop arm 26, is mounted to oscillate on pin 23b, and said arm 26 is carried by part 23a, of said bracket. The arm 26, is arranged above the plane of the wheel 21 and is swingable laterally to carry its free end over said wheel approximately toward and from the center thereof.

The free end of the freely laterally swingable arm 26, carries a vertical index or locking pin 27 perpendicular to the plane of the index disk or plate, and this pin is longitudinally slidable in said arm and provided with a spring constantly acting on the pin to project the same downwardly below the arm to press under downward tension on the top face of the index plate, and thus drop or snap into index points 28a, in the form of holes or sockets, to lock the indexing mechanism and the work table against rotation, until the pin or bolt 27, has been lifted against its spring from such indexing or locking socket 28a.

The lower or locking end of the locking or indexing pin 27, bears down on the top face of the index plate and said top face of the plate is provided with a path to which said pin is confined and along which the successive index points or sockets 28a, are located, and as wheel 21, and the index plate thereof are rotated for indexing purposes, the surface of the plate along said path rubs along the end of the pin, and the pin can successively enter said sockets, and this path is of a length to confine the pin thereto throughout a full rotation of the work.

To avoid the necessity of providing an index disk of the same diameter as the work table, where circular work is to be operated on at various points throughout the circle thereof, I provide an index plate of small diameter with respect to the work table diameter, and on the top face thereof provide a spiral path of several convolutions to which the index pin or lock is confined during a complete rotation of the work, where several revolutions of the index plate are required to a single rotation of the work, so that as the index plate is revolved step by step the pin will be restricted to and will travel along said groove, and the arm 26 will thereby be fed or swung laterally by the edge walls of the groove, forming the path, as the radial distance between the path and the wheel axis increases.

For instance, in the drawings I show an index plate the diameter of which is, say about, one fourth of the diameter of the work table, (and geared to the work table in the ratio of four to one), and the flat top surface of which provides an elongated flat-floor spiral groove 28, to receive the lower end of the index pin 27, and guide or feed the same laterally and form the path therefor, and the index points or locking sockets 28a, are formed by transverse holes or sockets through or in the floor of this spiral groove (bearing a scaled relation to the annular series of areas of the work to be engraved) so that the pin 27 will snap thereinto to lock the wheel at the completion of each forward indexing step. The groove 28, in the example shown, is continuous from its starting or inner end to its outer end and forms as many constantly increasing convolutions around the axis of the index plate, as revolutions of the index plate are necessary to cause one revolution of the work, four in this instance.

Where the work requires cutting or engraving, such as lettering, at various points or areas within the circle of the work as in cutting letters or other designs in a circular tire mold, the locking sockets or index points 28a, will be successively arranged along the floor of the multi-convolution groove 28, in scaled relation with respect to the annular series of areas of the mold that are to be engraved so that in scaled relation the length of groove 28 will be at least equal to the circle of said annular part of the work.

In the particular example illustrated, the index plate or wheel 21, is geared to the work table to rotate four times to one rotation of the table, and hence the spiral index groove 28, forms at least four complete convolutions. Of course, however, I do not wish to limit my invention to this particular ratio, as the gearing ratio can be changed to suit work or other conditions or peculiar requirements.

The lower end of the index pin 27 and the cross sectional dimensions of the spiral pathway, such as groove 28, are so formed, and the limit of relative upward movement of the pin 27, is preferably so established, that the pin 27, when once entered in the groove 28, will be confined thereto against removal therefrom, except and until the pin feeds out of the outer end of the groove at the depressed peripheral edge of the index plate, by rotation of the index plate in the proper direction. This absolutely prevents error in indexing, as by accidentally jumping the pin laterally from one convolution of the groove into an adjacent convolution, or otherwise as might occur if the pin could be lifted or otherwise clear the groove at any intermediate portion of the length thereof. The intention is to positively confine the pin to travel the full length of the groove, when once located in the inner end of the groove, and thus require the pin to enter and be freed from each index point in succession, as the index plate is rotated step by step, before the pin is free by discharge from the outer end of the groove.

With the work clamped on the work table, and the wheel 21 with its index plate having index points or sockets to control the annular series of areas of the work to be engraved or milled, and the work table lock 16, released so that the index wheel can rotate the work table, the arm 26, is swung in toward the index plate until index or locking pin 27, enters the outer end of groove 28, at the peripheral portion of the plate. The index wheel 21, is then rotated anti-clockwise until the pin 27, is fed throughout the length of the groove and snaps into the first index socket 28a, at the inner end of the groove, the pin 27, being lifted the slight distance necessary to free it from the sockets 28a, before it reaches the first socket.

The indexing wheel and consequently the work table and work are thus locked or set for the initial engraving or milling operation. The work table is then fixed or clamped by the lock 16. This initial indexing operation can be performed while the work table is in the horizontal position or after the work table has been tilted to bring the work into operative position with respect to the rotary cutter 11. After the engraving work (such as a letter, numeral or design) to be performed at the first index point has been completed, the clamp 16, is released, the index pin 27, is lifted from the first socket 28a, and the indexing wheel 21 (consequently the work table) is rotated clockwise (the pin 27 having been released to bear on the floor of groove 28) a step forward until the pin 27, snaps into the next socket 28a, of the succession of sockets throughout the groove 28. The work table is again locked and the second engraving operation on the mold is proceeded with, and these indexing operations are thereupon repeated around the circle of the mold and until the locking pin 27 runs out of the outer end of the groove 28.

Where the groove 28, is prepared for indexing letter engraving or other work on tire molds, the index sockets 28a, will be distributed at the proper intervals throughout the length of the groove, although the drawings merely diagrammatically show a few sockets 28a, to indicate that such sockets are located in the floor of the groove as required by each piece of work without attempting to show all of the sockets that may be required or any particular accurate socket location.

A grooved surface for the index disk is prepared for each piece of work that differs in dimensions etc. from other work. In the example shown, the index disk embodies a wheel having the handles by which the same is rotated and the sprocket wheel for driving chain 22, and a removable index plate 21e, normally fixedly bolted on top of and parallel with the wheel, to form the top surface thereof that is formed with the required spiral groove and locking sockets for cooperation with the index pin or pawl. These plates 21e, are interchangeable and can be readily removed from and clamped to the index wheel. The arm carrying the index pin can swing laterally out of the way to permit changing the index plates.

The same index plate 21e, can be employed to duplicate the engraving on a number of tire molds, or other pieces of work.

The index plates with the groove 28, but without the index sockets 28a, drilled therein, are supplied by the manufacturer, so that the machine user can locate and drill the sockets 28a, to suit each piece of work to be duplicated.

The machine as shown is adjusted for cutting lettering and the like in the inner portions of the walls of the annular tire mold concavity, and hence the parts are adjusted so that the cutter will operate on such portion of the mold concavity at the elevated left hand part of the mold W, when the carrier and work table are dropped down to depress the right hand part of the work and (where the work is of the large diameter shown) lift and move to the right the left hand part of the work to bring the desired part of the mold cavity up under and to the cutter 11. Where the work is of smaller relative diameter its left hand portion will drop and not lift.

The machine can also be adjusted and arranged to cut or engrave the tire tread designs in the outer annular portion of the annular concavity of the tire mold W, and the index sockets 28a in the index plate 21e, can be arranged accordingly usually by uniformly spaced sockets 28a, throughout the length of groove 28 to cause reproduction of a design unit in closely arranged or contiguous areas of the mold throughout the circumference thereof.

Where such tire tread designs are to be engraved, the column 10, is shifted to the right and the arm 9 is lowered to operate on the circumference of the mold concavity at the depressed right hand portion of the tilted mold.

Figure 15:
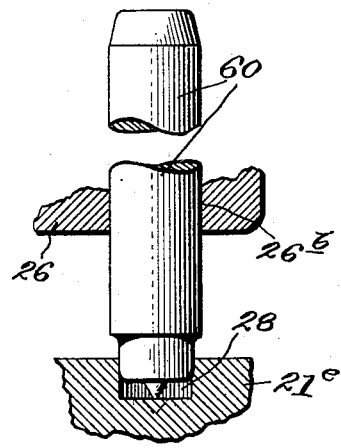
Fig. 15 is a detail section of means that can be employed to indicate the index points on the index disk or plate.
Figure 14:
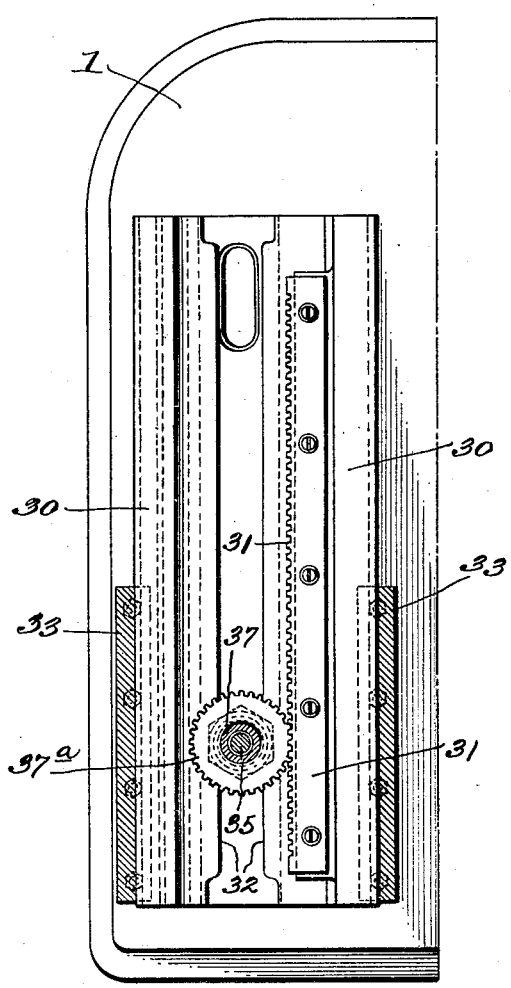
Fig. 14 is a horizontal section on the line 14—14, Fig. 3.
Figure 16:
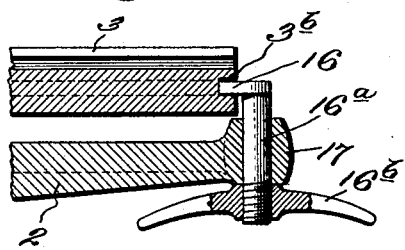
Fig. 16 is a detail vertical section on the line 16—16, Fig. 1.

To facilitate the proper location of the index sockets 28a, in the floor of the groove 28, I show the free end of the arm 26, formed with a vertical guideway or bore 26b, parallel with and spaced radially from index pin 27, to slidably receive a removable center punch 60 (Fig. 15) the lower end of which is formed to center and slidably fit within groove 28, and the bottom end of which is formed with a central depending point to mark and punch the floor of the groove 28, when the punch is subjected to a hammer blow. The proper locations of the sockets 28a, can thus be indicated in the floor of the groove, so that the holes to form said sockets can thereafter be accurately drilled in or through plates 21e.

Where a number of duplicate molds are to be engraved with letters, numerals, or the like on the side walls of their annular concavities, a sample mold to be duplicated is first engraved. Then the sockets 28a, in an index plate 21e, are laid out from the lettering on this sample mold, for instance, as indicated by Fig. 17, which is based on the example shown, where the work table is geared to the index wheel or plate 21e, to require four revolutions of the wheel to one revolution of the table and hence a four degree spacing on the plate 21e, will be a sixteen degree space on the work table, etc. Hence, to mark the index points or sockets on plate 21e, the plate is secured on the index wheel and the engraved mold on the work table, and when the mold is set at each engraving point with respect to cutter 11, the index point is located on the plate 21e by punch 60. When all of the index points have thus been located, the plate 21e, is removed and the sockets 28a, are drilled therein.

The upright column 10, that carries the forwardly projecting arm 9 for the cutting and pantograph mechanism, is located a distance to the rear of the elevated work table, and the rear end of the base 1 is formed or provided with a horizontal transverse straight column supporting track or slideway along which the column can be moved and to which said column can be fixed at any desired point within the length of the track.

This track embodies a pair of fixed elevated parallel spaced horizontal slideways or rails 30, that overhang at their outer longitudinal edges. Between said rails, the base provides a longitudinal depression, in which and to one side thereof is fixed a longitudinal rack 31, parallel with said rails; and also provides a depressed central longitudinal slot forming longitudinal flanges 32, parallel with the rails 30.

The column 10, is formed with a base seated on and slidable longitudinally of the rails 30, and this base provides spaced parallel surfaces to slide on the top faces of the rails 30, and depending flanges 33, depending at the outer longitudinal edges of said rails and at their lower portions carrying plates 34, lapping under the overhanging portions of said rails 30, whereby the column is centered on the track and held thereto.

The column is longitudinally tubular or hollow and a rotary clamping bolt or screw shaft 35, extends through the column and above the same is provided with a rotating handle 35a, while the threaded lower end of the shaft 35, is threaded into angular clamping nut 36, located below the column in the slot between the two base flanges 32 and having shoulders under said flanges. When the handle 35a, is rotated in one direction the nut is drawn up against flanges 32 to rigidly clamp the column in fixed position on the base. When the shaft, by its handle 35a, is turned in the opposite direction, the nut 36, is loosened and the column can be adjusted along its tracks on the base, with the nut carried by the column and sliding along the base flanges 32.

Mechanism is provided to advance the column in either direction along its base tracks, when the clamp 35—36—32 is loosened. For instance, a rotary shaft 37 extends through the column, and a gear 37a, is fixed to the lower end of this shaft and an exposed handle 37b to the upper end thereof. The gear 37a, is in mesh with the rack 31 fixed to the base, and hence the column can be caused to slide along its trackway on the base by rotation of shaft 37.

In the example illustrated, the column propelling shaft 37, is tubular and concentrically and longitudinally receives the clamping shaft 35 which is rotatable therein.

The column embodies several longitudinally telescoping tubular members, relatively movable longitudinally for the purpose of changing the elevation of the horizontal forwardly extending cutter mechanism supporting arm 9. For instance, the main or base section 10, of the column is tubular and formed at its upper portion to provide a split clamp that can be contracted and loosened by clamping bolt 39 having exterior operating handle 39a. The tubular upper section 10a, of the column telescopes into section 10, and forms a fixed upward continuation thereof when clamped by the split upper end of section 10, when bolt 39 is tightened. When bolt 39 is loosened, the upper section 10a can slide vertically in section 10. The upper section 10a, is held against rotation in the lower section 10, by key 40, entering longitudinal groove or keyway 10b, in the upper section 10a.

The upper section 10a, is raised and lowered in section 10, and held in the desired adjustment by rotary tubular adjusting screw 41, receiving and rotatable on the hollow column advancing shaft 37, and fitted between end abutments to prevent longitudinal movement of the screw on said shaft, and meshing with internally threaded nut 10c, formed by the upper end of said column section 10a. The hollow screw 41, extends above the column section 10a, and has a fixed handle 41a, exposed and accessible for rotation of the screw to elevate and depress the section 10a.

The upper end 10d, of the column section 10a, is exteriorly cylindrical and formed with an exterior annular supporting shoulder 10e, to receive the inner end of the cutter mechanism supporting arm 9, which is in the form of a vertical split hub or sleeve 9a, fitted on said column vertical journal end 10d, and rotatable thereon, when loosened, to swing the arm 9, horizontally on said end 10d, as a center. The sleeve or hub end 9a, is normally rigidly clamped to the column to hold the arm in the desired angular position. The hub end of the arm 9, in the example shown, is split to form a split clamp and is loosened on and clamped to the column end 10d, by clamping bolt 44, having accessible handle 44a.

The work, such as a tire mold, is often heavy and cumbersome to handle in placing the same on and removing the same from the work table. The work sometimes weighs up to approximately four thousand pounds, more or less, requiring the use of traveling cranes, hoists or the like, for handling the same. Hence, one of the important advantages of the boom or arm 9, carrying the cutter mechanism, is that the boom and cutter mechanism can be easily moved entirely clear of the work and work table, and laterally beyond the same, entirely out of the way of the crane or hoist and the work during the operations of applying and removing the work.

By loosening the arm hub clamping bolt 44, the arm is free to horizontally swing back in either direction to a position over or to the rear of the rear end of the base, and this without disturbing the position of the supporting column or the adjustment thereof, and without necessarily disturbing the adjustments of the cutting mechanism carried by said arm. The arm can be as easily swung back to operative position and then set in such position by tightening clamping bolt 44.

By rotation of the boom or arm supporting column handle 37b, the column (carrying the arm 9 and the cutting mechanism) can be caused to slide in either direction transversely of the base to bring the cutter to any point desired along a diameter, of the work on the work table, that is parallel with the straight line path of travel of the column, i. e., to bring the cutter to any point radially toward and from the work table center.

By rotating the handle 41a, the column can be adjusted to raise and lower the arm 9, and the cutting machanism to bring the cutter to the desired elevation required by the work on the work table. The boom or arm 9, preferably carries the motor by which the rotary cutter is driven through the medium of any suitable drive, such as a belt transmission, and also carries the cutter head, the controlling pantograph, the stylus or tracer, and the pattern, and all of such parts are arranged on or at the free end of the forwardly projecting arm 9, and over the work on the work table, so as to be freely accessible to the operator standing on the front end platform 18, from which point, the indexing mechanism is also clearly visible and accessible.

Advantages in the matters of safety and convenience are gained by providing the vertically swingable carrier for the elevated rotary work table above the carrier whereby the work table can be brought to the horizontal position for reception of the work and for clamping and adjustment thereof, and whereby the weight of the parts and the load can then be utilized in dropping or tilting the work to the desired angle for engraving, with the indexing mechanism arranged approximately horizontally and always maintaining its angle and position with respect to the table and located a distance laterally therefrom and remote from the work and cutting mechanism, and always readily accessible for indexing purposes.

It is evident that many and various changes, additions, omissions, departures and variations can be resorted to without departing from the spirit and scope of my invention and hence I do not wish to limit myself to the approximate disclosures hereof, but consider myself entitled to all changes, etc. mentioned, that fall within the spirit and scope of my claims.

What I claim is:—

1. In combination with a rotary work table, indexing mechanism for said table comprising a rotary member operatively coupled to rotate said table, said member formed with a spiral guideway of several convolutions having spaced index points, and an index pawl adapted to travel in said groove from index point to index point and provided with and carried by and located at the free end of an arm swingable on an axis supported independently of said member.

2. In an engraving machine and the like, a work table, in combination with mechanism for indexing the table comprising an index wheel formed for rotation by hand and operatively coupled to the table to rotate the same and provided with means having a horizontal flat top face providing a spiral guideway in length approximately equal in scaled relation to the diameter of the annular portion of the work to be operated on, and formed with index points, and a swing arm extending over said top face and provided with a locking or index pawl to travel in said groove and cooperate with said index points, said pawl confined against jumping from said groove.

3. A carrier, and a rotary work table carried thereby, in combination with a rotary index wheel of relatively reduced diameter mounted on said carrier and spaced radially from said table and geared thereto to rotate with and in scaled relation to the table, said wheel provided with a series of successive index points, a swing arm pivotally mounted independently of and beyond said wheel and extending laterally thereover and at its free end provided with an index pawl arranged to travel to said index points in succession, and means confining said pawl to travel the full length of the path that includes said points.

4. Indexing mechanism for indexing the work table of an engraving or other machine, embodying an index wheel of small diameter with respect to the table and operatively connected thereto to rotate the same step by step, said wheel having an elongated spiral groove having a series of successive index sockets, a locking index pawl arranged to travel in said groove and successively enter said sockets, and a movably and independently supported carrier for said pawl, said carrier at a point adjacent to said pawl being provided with a guideway for a punch for marking the locations for the index points in the floor of said groove substantially as described.

5. In combination, in an engraving or milling machine, a base, a gravity-drop work table carrier embodying a top and a depending portion providing an upright wall, said carrier also having a rigid elevated lateral portion, the base having an elevated support to which said lateral portion is mounted to constitute the axis on which the carrier swings vertically, a rotary work table arranged above said top approximately parallel therewith, screw means cooperating with the base and said wall for determining the gravity drop of the carrier and consequently the angular position of the table and for elevating the carrier to bring the table to approximate horizontal position for application and removal of the work, means for normally holding the table against rotation, table indexing means arranged above said carrier, cutting mechanism for operating on the work, and elevated supporting means independent of the carrier for carrying the cutting means above the work on the table, said supporting means being movable laterally from operative position to clear the work during application of the work to and removal of the work from the table.

6. In combination, in an engraving or milling machine, a base, a work table carrier embodying a top and a rigid lateral portion, the base having an elevated support to which said lateral portion is mounted to constitute the axis on which the carrier swings vertically, a rotary work table arranged above said top, screw means for determining the angular position of the table and for elevating the carrier to bring the table to approximate horizontal position for application and removal of the work, means for normally holding the table against rotation, table indexing means arranged and accessible to the operator above said carrier, pattern controlled cutting mechanism for operating on the work, and supporting means for carrying said cutting mechanism above the work and rendering the same accessible to the operator above the work.

7. In engraving and milling machines and the like, in combination, a work table mounted to rotate for indexing, an indexing wheel geared to said table to require several rotations of the wheel to each rotation of the table, a disk removably secured to and rotating with the wheel and having a flat face formed with a spiral guideway of several convolutions having index stops, and indexing stop means adapted to said groove for cooperating with said stops, said means having a carrier movable over the flat face of said disk and supported independently of said disk.

8. In engraving and milling machines and the like, in combination, a work table mounted to rotate for indexing, an indexing wheel geared to said table to require several rotations to each rotation of the table, and indexing stop means embodying a swing arm carrying an index or lock pin for the wheel and table and a spiral path of several convolutions located in a common plane at right angles to the axis of said indexing wheel, said arm swingable in a plane parallel with said common plane, said pin being confined to travel in said spiral path to swing said arm by the rotation of said wheel, the index points being located along said path.

9. In engraving and milling machines and the like, in combination, a work table mounted to rotate for indexing, an indexing wheel geared to said table to require several rotations to each rotation of the table, and indexing stop means embodying a disk for removably securing to said wheel and having a flat face with a spiral groove of several convolutions continuous from its inner to its outer end and including the index points and an index lock confined to said groove against displacement therefrom between the inner and outer ends thereof, and adapted to said index points to stop the wheel and table when the lock reaches each point in its travel throughout the groove.

10. In engraving and milling machines, indexing mechanism for a work table rotatively mounted for indexing, embodying a rotary disk with a flat face at right angles to the axis of rotation having a spiral groove having index point sockets therein, and stop means confined to travel in said groove and successively cooperate with said sockets to stop the work table throughout a complete revolution of the table.

11. In engraving and milling machines, a work table mounted to rotate for indexing, in combination with indexing mechanism for said table embodying an index wheel spaced radially from said table and having an axis parallel with the table axis and geared to the table to require several rotations of the wheel to each rotation of the table, a removable flat disk rotatable with said wheel and formed with a spiral groove of several convolutions in a common plane with index points, said indexing mechanism including stop means movable over said disk to cooperate with said groove and the index points.

12. In engraving and milling machines, a work table mounted to rotate for indexing, in combination with indexing mechanism for said table embodying an index wheel geared to the table to require several rotations of the wheel to each rotation of the table, an index plate rotating with said wheel and formed with the index points and a groove forming a pathway along said points, and a swing arm arranged to extend over said plate and carrying an index pin adapted to said grooves and to cooperate with said points and confined to said groove against jumping therefrom, said groove being of sufficient length to cooperate with said pin throughout the complete rotation of said table.

13. Index mechanism for a work table mounted to revolve for indexing, comprising an index plate formed to be removably secured to an index wheel and having a spiral groove in its top face to receive the index pin, and adapted to have the index points, such as sockets formed along said groove to cooperate with said pin.

14. In indexing mechanism for a work table that is mounted to rotate for indexing, an indexing wheel geared to the work table, an index plate adapted to be fixed on said wheel and having a spiral groove adapted to have the index sockets formed along the floor of the groove, a swing arm mounted independently of the wheel and table and at its free end provided with the index pin formed to fit said groove and enter said sockets, said arm at its free end having a vertical guide, and a punch adapted to said guide for indicating the index points on the floor of the groove preparatory to forming sockets at said points.

15. In engraving and milling machines, and the like, a work table carrier, a supporting base therefor, a work table arranged above the carrier and formed to carry the work on its top face, said table being rotatable with respect to the carrier for indexing and having an annular edge groove, a clamp for locking the table to the carrier and for releasing same for rotation, said clamp mounted on the carrier and entering said groove to clamp and release the table.

16. In combination, a base having an elevated support providing an elevated transverse axis, a work table carrier mounted to rock vertically on said axis, means to control the angular position of the carrier, an elevated top work table arranged above and carried by said carrier and located to one side of said axis and at its top side formed to receive the work, and an index wheel for said table, said wheel rotatable on an axis parallel with the axis of the work table and radially remote from said table and carried by and located above the carrier on the other side of said transverse axis from said table.

17. In combination; a base; a gravity-drop work table carrier forming a depending lubricant-retaining work-table-upholding well; an exposed top work table rotatable for indexing and elevated above said carrier and provided with and upheld by a central depending spindle rigid therewith, said spindle depending and rotatable within and supported by said well; said carrier having an elevated radially projecting end; said base providing an elevated horizontal axis receiving said end and on which said carrier is vertically swingable to drop by gravity from and to return the table back to horizontal position; and means cooperating with said depending portion of the carrier to limit the drop of the carrier and to swing the carrier on its return movement.

18. In combination; a base; a work-table carrier having a rigid depending part providing at its lower portion a stop surface; said carrier provided with a top lateral extension rigid therewith; said base having an elevated rigid support providing a horizontal carrier supporting axis transversely of said extension and on which the carrier is swingable vertically to drop by gravity; a work table arranged above said carrier to one side of said horizontal axis and mounted on said carrier to rotate for indexing on an approximately vertical axis remote from said horizontal axis; and stop screw mechanism embodying a stop screw and its nut carried by the base below said horizontal axis, said screw abutting said stop surface to limit the drop of the carrier and to elevate the same, said mechanism and surface cooperating with said horizontal axis to support the carrier and its load, said mechanism having accessible operating means for rotation thereof to determine the angular position of the carrier and the table thereabove.

19. In combination; a base having a horizontal track; a vertically tiltable elevated work table carrier arranged in advance of said track; said base having a rigid elevated support providing an elevated horizontal axis on which said carrier is swingable; a work table above and carried by said carrier and having an exposed top face for the work; means for determining the angular position of said carrier and the work table; an upstanding column having a base confined to said track; means for normally locking the column in fixed position at any point along the track; means for moving the column to any position along said track; a boom carried by said column and arranged to project forwardly therefrom above the work table and the work thereon; cutting means and its controlling mechanism carried by said boom and embodying a depending rotary cutter spindle to operate on the work; means for normally locking said boom in fixed operative position with respect to the column and work, and whereby said boom can be released to swing horizontally to abnormal position clearing the table to permit application of the work to and its removal from the table; said column embodying a longitudinally adjustable element whereby said boom can be raised and lowered and normally locked at the desired elevation, exteriorly accessible operating means being provided for said locking and adjusting means.

20. In combination; a base having a track, a work table and its mounting carried by the base, said table having a top face exposed for the work; an upright column having a supporting base confined to and movable along said track; gearing for propelling the column along the base, an upright operating shaft for said gearing, said shaft arranged within the column and having elevated operating means accessible at the exterior of the column; means for normally locking the column to the base in fixed position along the track, said last mentioned means having an operating member accessible at the exterior of the column; an elevated boom carried by the column and normally held in fixed position extending laterally over the work on the table; and cutting mechanism for operating on the work, said mechanism carried by the free end of the boom and movable with respect thereto during the cutting operation to execute the desired design in the work while the boom is held in fixed position.

21. In combination; a base having a carrier support; a gravity-drop carrier mounted on said support to swing vertically on an elevated transverse axis, said carrier provided with an exposed top work table, said carrier being also provided with a depending portion having an upwardly elongated abutment surface depressed with respect to said axis; and an elongated rotary carrier supporting and elevating screw having screw threaded connection with said base normally holding said screw against endwise movement and whereby said screw is moved longitudinally when rotated, said screw being located below the horizontal plane of said axis and arranged transversely of and constantly abutting said surface to uphold said carrier, and to lift and elevate said carrier by longitudinal inward movement of the screw with relative longitudinal sliding engagement of said surface against the abutting portion of the screw, and to permit gravity drop of said carrier with said relative longitudinal sliding movement of said surface on the abutting portion of the screw when the screw is rotated to move outwardly.

22. In combination; a support; an approximately horizontal carrier mounted on said support to swing vertically on a transverse axis; an exposed top approximately horizontal work table eccentrically loading said carrier and arranged above and carried thereby; said carrier with its load constantly tending to drop by gravity from an approximately horizontal position to an angular position, said carrier having a vertically elongated rigid portion provided with a vertically disposed abutment surface, said surface moving laterally in one direction when said carrier drops and in the opposite direction when the carrier swings upwardly; and a rotary carrier-supporting and elevating screw having screw threaded connection with said support normally holding said screw against endwise movement and to straight line endwise movement when rotated, said screw being arranged vertically remote from said axis and transversely with respect to said surface with the inner end of the screw opposing downward movement of said carrier, said surface being constantly held in abutting sliding engagement with said screw end by the constant tendency of the carrier to drop, whereby the carrier is elevated by the sliding abutting contact between the screw end and said surface when the screw is advanced inwardly, and the carrier drops by gravity with said surface abutting and following said screw when the screw is retracted outwardly.

23. A tire mold engraving machine and the like, a base; a carrier; a work table arranged over and supported by the carrier and rotatable for indexing; indexing mechanism for said table embodying a rotary member geared to said table, whereby the table and member rotate one from the other for indexing, said member having a spiral guideway including the index points, an indexing pawl to travel in said guideway and adapted to said points, a movable pawl support; and a swingable bracket pivoted to said carrier and provided with means for locking the bracket in adjusted position, the pawl support being supported by said bracket, said rotary member being carried by and movable with said bracket with its axis of rotation eccentric to the axis on which the bracket is swingable.

24. A tire mold engraving machine and the like, including a base; a carrier supported by the base; a work table over and supported by said carrier and rotatable for indexing and exposed at the top to receive the work; indexing mechanism for said table supported by and accessible from above said carrier; a boom supported by the base and normally extending forwardly above the table and work thereon with its front end in normal fixed position terminating above the table and work; an organized engraving mechanism mounted in fixed relation on and operatively movable with respect to the front end of said boom, said mechanism embodying pattern holder, a tracer, a pantograph controlled by the tracer, and a laterally movable pantograph-controlled rotary cutter spindle to drive the cutter in reproducing in scaled relation the pattern on the work while said boom is fixedly held in normal position; a stand for the operator in front of said carrier, whereby the boom, indexing mechanism, top of the work, and engraving mechanism are all accessible and visible to the operator from said stand; and a rear support for said boom including means for locking said boom in its fixed certain forwardly projecting normal position, and whereby said boom can be released for rearward swing to an abnormal position clear of the table and work.

25. A tire mold engraving machine, including an organized engraving mechanism embodying a rotary cutter; a tracer to follow a pattern, a pattern holder, and a pantograph controlled by the tracer and controlling the lateral movements of the cutter to reproduce the pattern in scaled relation on the work; a boom on the free end of which said engraving mechanism is mounted in normal fixed relation and operatively movable with respect to the boom and in an elevated position over the work and work table and accessible from the operator's stand; means supporting said boom from the base and whereby the boom can be fixed in its normal position with the cutter operatively located with respect to the area of the work to be engraved, and whereby the boom can be released for swinging to temporary position from above the work table to permit application of the work to and its removal from the work table; and a work table and its carrier supported by the base, said table having its top face exposed to receive the work.

26. A tire mold engraving machine and the like, including a base; a work table and its mounting carried by the base with the top side of the table exposed to receive the work; an organized pattern-controlled engraving mechanism for reproducing the pattern in scaled relation on the work under the control and manipulation of the operator, the top of the work and said mechanism being accessible and visible from the operator's stand; a support adjustable along the base and normally held in fixed position thereon; a boom carried by said support; said engraving mechanism being carried by said boom in fixed relation and operatively movable with respect thereto and in an elevated operative position with respect to the work; and means for locking said boom in fixed normal operative position holding said engraving mechanism in fixed operative position above and with respect to the work, and whereby the boom can be released for movement to carry said engraving mechanism to abnormal position clear of the work and work table.

27. A tire mold engraving machine and the like, including a base; a work table and its mounting carried by the base with the top side of the table exposed to receive the work; an organized pattern-controlled engraving mechanism for reproducing the pattern in scaled relation on the work under the control and manipulation of the operator, the top of the work and said mechanism being accessible and visible from the operator's stand; a support adjustable along the base and normally held in fixed position thereon; a boom carried by said support; said engraving mechanism being carried by said boom in fixed relation thereto and in an elevated operative position with respect to the work; and means for locking said boom in fixed normal operative position holding said engraving mechanism in fixed operative position above and with respect to the work, and whereby the boom can be released for movement to carry said engraving mechanism to abnormal position clear of the work and work table, said support being vertically extensible to bodily adjust the boom and the mechanism carried thereby vertically. means being provided to lock the support to hold the boom at the elevation to which adjusted.

28. A tire mold engraving machine and the like, including a base; a work table and its mounting; engraving mechanism for operating on the work on the table including a pattern holder, tracer, and movable cutter head operatively connected to and controlled by the tracer; a column adjustable along and normally fixed to the base; a boom carrying said engraving mechanism in normal operative position above the work on the table, said boom having a hub centered and rotatable on the column; and means for normally clamping the hub fixedly to the column to fixedly hold the boom in normal operative position.

Signed at Cement, Oklahoma, this 31 day of Aug., 1926.

GEORGE GORTON.